Patented Sept. 13, 1949

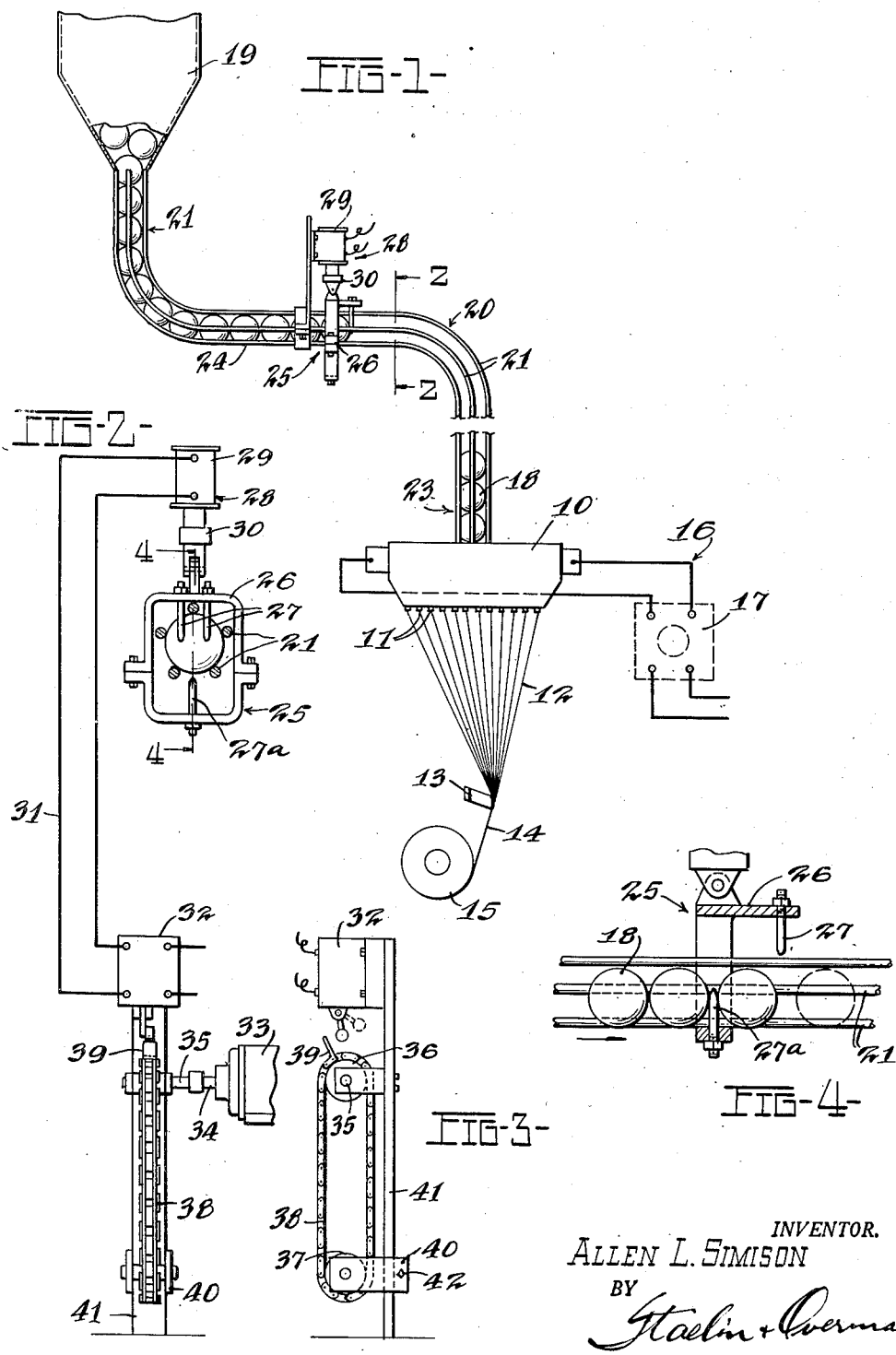

2,482,071

UNITED STATES PATENT OFFICE 2,482,071

METHOD FOR PRODUCING FIBERS

Allen L. Simison, Newark, Ohio, assignor to Owens-Corning Fiberglas Corporation, a corporation of Delaware Application August 27, 1946, Serial No. 693,175

3 Claims. (Cl. 49—77.5)

This invention relates to an improved method for producing fibers from heat softenable material, such for example, as glass.

The present invention has as one of its principal objects to continuously produce fibers having a constant uniform diameter and for this reason finds particular utility when used in the manufacture of so-called continuous fibers.

In the so-called continuous fiber process, glass cullet or batch is introduced into a feeder heated electrically or otherwise to a temperature sufficiently high to melt the glass and having orifices at the bottom through which molten glass flows by gravity in the form of streams. The streams are attenuated to fine fibers which may be collected into a strand and wound upon a suitable collecting drum.

The collecting drum is rotated at a substantially constant rate in order to attenuate the fibers at a more or less uniform linear speed. It would appear off hand that, since the rate of attenuation is constant, the diameter of the resulting fibers would be uniform and the number of yards of strands per pound of glass attenuated would always be within relatively narrow limits. However, in actual practice, this has been very difficult to achieve and exhaustive study indicates that the difficulties arise from a number of factors among which are the fluctuations in temperature of the molten glass as well as changes in viscosity in and adjacent to the region of attenuation.

It will be understood that as glass batch or cullet is fed into the feeder, the supply of molten glass in the latter is augmented. Concurrently, however, the supply of molten glass in the feeder is being depleted by the molten glass flowing from the orifices in the form of streams. As stated above the flow of molten glass from the feeder is by gravity, and for a given sized orifice, is dependent upon the temperature and the viscosity of the molten glass flowing through the orifices. Thus, if the temperature ambient to the orifices is lowered by the flow of air currents passing across the bottom of the feeder, the tendency is for the flow of molten glass to be decreased. Inasmuch as the rate of attenuation is practically uniform, it follows that the fibers being attenuated decrease in diameter.

Efforts have been made in the past to either manually or automatically control or regulate the temperature of the feeder to compensate for temperature variations in the molten glass issuing from the feeder orifices. In previous operations glass was fed to the bushing at the rate at which it melted. The temperature was controlled and depended upon to regulate the flow from the bushing. Certain difficulties with this method of operation include the fact that controlling the temperature did not compensate for changes in viscosity in the glass due to changes in the glass composition, which seriously affected the size of the attenuated fibers.

Also the operation in this manner required close manual inspection or the use of complex automatic control devices to regulate the temperature. Manual operation requires the constant close attention of an experienced operator and this is not always entirely accurate. The provision of automatic mechanism for regulating the temperature of the feeder overcomes some of the objection of manual operation but this results in frequent operation of the controller with consequent excessive wear of the controller contacts. The automatic controlling mechanism generally used operates in a manner whereby the current is on or entirely off. The sudden making and breaking of contacts through which a heavy heating current is flowing causes considerable arcing which at times causes the contacts of the controller to weld together. This, of course, requires shutting down the operation entirely.

Another method of operation allows the level of glass in the bushing to vary according to minor temperature and viscosity variations. By this method increases in temperature produce a more fluid glass which in turn is formed into fibers of a larger size, while decreases, as pointed out before, result in fibers of a smaller diameter than desired. The overheated glass which flows through the bushing at a higher rate thus depletes the supply of glass in the bushing so that the head of glass is greatly reduced. This, of course, reduces the pressure on the glass at the orifices so that less glass is caused to flow therethrough. At the constant rate of attenuation this overcomes to a certain extent the tendency to form oversize fibers from the more fluid glass.

Consequently a decrease in temperature of the glass in the bushing operates conversely so that the volume of glass increases due to the lower rate of flow of the cool glass and at the same time the head of glass within the bushing is increased which thereby increases the throughput of the colder glass. This process is subject to undesirable limitations in the manufacture of fibers and it is the purpose of the present invention to overcome the difficulties encountered in the processes above mentioned.

It is one of the objects of this invention to overcome the above difficulties and to provide glass fibers of uniform diameter. More specifically, the present invention has as its object a process of making glass fibers in which normal variations in the temperature or viscosity of the molten glass in the feeder and immediately adjacent the discharge side of the feeder have no substantial adverse effect upon the diameter of the fibers attenuated.

It is another object of the invention to provide a process and means for forming glass fibers in which the diameter of the fibers attenuated may be held within the desired range by controlling the factor subject to positive mechanical control and which will effect the desired aim independently of temperature variations.

A further object of this invention is to provide means for visibly indicating the operating conditions of the process.

Still another object of this invention is to regulate the passage of glass cullet or marbles from a suitable source of supply to the column by a gate automatically operated at regular intervals by means subject to variable control to enable feeding the glass cullet to the feeder at the selected rate.

The foregoing as well as other objects will be made more apparent as this description proceeds, especially when considered in connection with the accompanying drawing, wherein:

Figure 1 is a diagrammatic view of one form of fiber producing apparatus embodying this invention;

Figure 2 is a diagrammatic elevational view of the glass cullet feeding mechanism;

Figure 3 is a fragmentary sectional view of the glass cullet feeding means; and

Figure 4 is a sectional view taken substantially on the line 4—4 of Figure 2.

It will be understood from the foregoing that the purpose of this invention is to manufacture, on a production basis, fibers of uniform diameter from a heat softenable material regardless of the normal temperature fluctuations ordinarily existing in either the melting chamber or in the fiber forming zone. In describing the invention, particular stress is placed on the manufacture of substantially continuous glass fibers of uniform diameter, but it will be apparent as the description proceeds that the invention is applicable to practically any fiber forming process in which molten thermoplastic or other heat softenable material flows through orifices as streams which are then attenuated to fibers of the selected diameter.

With the above in view reference is made to Figure 1 of the drawing wherein the numeral 10 indicates a melting chamber or feeder adapted to contain a supply of molten glass and having a multiplicity of orifices 11 in the bottom wall through which molten glass flows in the form of streams 12. The streams are attenuated to form filaments and the latter are gathered by any suitable means 13 to form a strand 14. The strand is wound about a collecting drum 15 suitably supported for rotation and driven at a substantially constant rate of speed by means not shown herein.

The fiber diameter depends largely upon the linear speed at which the fibers are wound on the collecting drum 15 and this rate is ordinarily within a range from 5000 to 15,000 feet per minute. Regardless of the rate of attenuation selected, it remains fairly constant throughout the fiber forming operation, so that it appears reasonable to assume that the resulting fibers should be of uniform diameter or, in other words, the number of yards of fiber per pound of fibrous glass formed should always be within relatively narrow limits. However, in actual practice, other conditions arise which make it very difficult to achieve the above results even though the rate of attenuation is held constant within very close limits. It is believed that one of the chief causes of fiber non-uniformity is due to the fluctuations in temperature of the molten glass in and immediately adjacent to the delivery side or bottom of the feeder. Such fluctuations in temperature are extremely difficult to anticipate and control. As will be understood from the following description, however, the fluctuations in temperature ordinarily experienced in the fiber forming zone are prevented from having any appreciable adverse effect on the uniformity of the fibers.

Before describing the manner in which the above is accomplished, reference is again made to Figure 1 of the drawing, wherein the feeder 10 is shown as connected in series with an electrical heating circuit 16 having a manually operable rheostat 17 for controlling the current and thereby regulating the temperature of the feeder. This temperature will vary depending upon the heat softenable material being used, but in any case, is sufficient to melt the material to the proper viscosity for flow through the orifices 11 by the action of gravity.

The heat softenable material herein shown as glass stock is fed into the top of the feeder and may be in the form of batch or cullet such, for example, as marbles 18. The marbles are supplied from a hopper 19 and are discharged by gravity from the bottom of the hopper into the upper end of a chute 20. In the present instance, the chute 20 is formed by four or more bars 21 spaced from each other around the circumference of a circle somewhat greater in diameter than the diameter of the marbles 18 and arranged to retain the marbles in the chute. The receiving end 22 of the chute extends downwardly from the hopper and the delivery end 23 of the chute projects vertically in a downward direction to the top of the feeder 10. The vertical delivery portion 23 of the chute is connected to the receiving portion 22 by a substantially horizontal section 24 and provides a visible column of glass marbles ready for entrance into the feeder. The glass marbles previously admitted to the feeder 10 are supported on the surface of the molten glass and as the lowermost marbles melt the marbles of the column directly above the feeder descend by gravity into the feeder so that the operation of the latter is continuous. In this way the glass is maintained at a substantially constant level.

The transfer of glass marbles from the horizontal portion 24 of the chute 20 to the column or vertical delivery portion 23 of the chute is controlled by a gate 25 located above the horizontal section 24 of the chute between the receiving and delivery portions thereof. The gate 25 comprises a rectangular head member 26 encircling the chute and provided at its upper end with laterally spaced depending pins 27 positioned to straddle the top bar 21 of the chute and being of sufficient length to extend into the path of travel of the marbles. A single upstanding pin 27a is mounted in the lower end of the head 26 and is positioned slightly in advance of the vertical plane of the pins 27 in the direction of the marbles detained by the pins. Upon retraction of the head 26, as will be described presently, the pin 27a is introduced between the first and second marbles as the pins 27 are withdrawn. Thus a single marble is released at each operation of the head.

The gate is operated to withdraw the pins 27 from the chute and permit passage of a marble by an electromagnet 28. The electromagnet 28 comprises a coil 29 and a plunger 30 extending into the coil. The coil 29 is connected in an electric circuit 31 including a limit switch 32 periodically operated at regular intervals by a synchronous motor 33. The drive shaft 34 of the motor 33 is coupled to a driven shaft 35 having a sprocket 36 secured thereto and connected to an idler sprocket 37 by a chain 38. The chain 38 has a trip 39 secured thereto in a position to engage the limit switch 32 and operate the latter to close the circuit 31 to the solenoid coil 29. Thus, the coil 29 is energized and the plunger 30 is raised to withdraw the gate from the chute and permit passage of a marble to the vertical delivery portion 23 of the chute.

The synchronous motor 33 drives the shaft 35 at a constant rate of speed so that the gate 25 is withdrawn to feed glass marbles 18 to the feeder 10 at regular intervals. The rate of feed of marbles to the feeder depends upon the length of the chain 38 and may be varied by decreasing or increasing the length of the chain depending upon whether the rate of feed of the glass marbles is to be increased or decreased. In this connection it will be noted from Figure 3 of the drawing that the sprocket 37 is supported on a bracket 40 which is slidably mounted on a vertical rod 41 and is clamped to the latter by a fastener element 42. Thus the timing mechanism may be readily adjusted to suit chains of different length by merely sliding the bracket 40 on the vertical rod 41.

The marbles melt in the bushing and add to the supply of molten glass therein. Concurrently the supply of molten glass is being depleted by the molten material flowing from the orifices of the feeder. The flow from the feeder is, of course, by gravity and for a given sized orifice is dependent upon the temperature of the molten glass passing through the orifice. If the temperature of the feeder surrounding the orifice is lowered as by air currents passing thereover, the tendency is for the flow of molten glass to be decreased. This, of course, causes the fibers being attenuated to decrease in diameter, because as previously pointed out, the rate of attenuation is constant and the smaller quantity of molten glass in the stream necessarily results in a finer fiber.

As previously stated, the number of glass marbles 18 in the column 23 is clearly visible by the operator and the height of this column is an excellent indication of the rate at which the glass marbles are being melted in the feeder 10 in relation to the rate of flow of molten glass through the orifices 11. In carrying out the process, it is desired to maintain the height of the column of marbles in the delivery portion 23 of the chute 20 constant, because by so doing, a uniform flow of molten glass through the discharge orifices is assured.

In practice, if it is observed that the height of the marble column in the delivery section 23 of the chute 20 falls below a preselected height, the rheostat 17 is manipulated to decrease the current in the heating circuit 16 and thereby correspondingly reduce the temperature in the feeder so as to slow down the melting period. On the other hand, if the height of the marble column rises above the selected height, the temperature in the feeder is increased to speed up the melting period by increasing the current flow in the heating circuit. By following the above procedure to maintain the height of the marble column substantially constant, minor variations in temperature in the region of fiber formation are relatively ineffective and the amount of molten glass flowing through the orifices in the feeder remains fairly constant so that the length of the strand of glass fibers attenuated will correspond to the quantity of cullet fed into the feeder. As a result, proper selection of the rate of feed of glass cullet into the bushing will determine the yards per pound of the fibrous strand attenuated and, since this rate of feed may be exactly and constantly controlled, the fibers produced will closely conform to preselected standards.

I claim:

1. The process of making fibers from a heat-softenable material which comprises maintaining a body of molten heat-softenable material within a heated zone, flowing streams of molten material from the body at rates depending upon the viscosity of the molten material, attenuating the streams of molten material to fibers at a constant rate, supporting a column of separate pieces of solidified heat-softenable material on the body of molten material in said heated zone, heating the lower end of said column to melting temperature to progressively melt the material in the column and cause the pieces of material to move downwardly into the body of molten material, feeding pieces of solidified heat-softenable material to the top of said column at a constant rate so that the column increases or decreases in height when the rate of said flow of streams from said body is less or greater respectively than said constant rate of feed of material to the top of said column, and varying the temperature of said heated zone in direct order to the change in height of said column to thereby vary the viscosity of the molten material in said zone and the rate of flow of said streams from said body so as to keep the rate of flow substantially equal to said rate of feed of material to said column.

2. The process of making glass fibers which comprises maintaining a body of molten glass within a heated zone, flowing streams of molten glass from the body at rates depending upon the viscosity of the molten glass, attenuating the streams of molten glass to fibers at a constant rate, supporting a column of separate pieces of solidified glass on the body of molten glass in said heated zone, heating the lower end of said column to melting temperature to progressively melt the glass in the column and cause the pieces of glass to move downwardly into the body of molten material, feeding pieces of solidified glass to the top of said column at a constant rate so that the column increases or decreases in height when the rate of said flow of streams from said body is less or greater respectively than said constant rate of feed of glass to the top of said column, and varying the temperature of said heated zone in direct order to the change in height of said column to thereby vary the viscosity of the molten glass in said zone and the rate of flow of said streams from said body so as to keep the rate of flow substantially equal to said rate of feed of glass to said column.

3. The process of making glass fibers which comprises maintaining a body of molten glass, flowing streams of molten glass from the body at rates depending upon the viscosity of the molten glass, attenuating the streams of molten glass to fibers at a constant rate, supporting a column of glass marbles on the body of molten glass, heating the lower end of said column to melting temperature to progressively melt the marbles in the column and cause the marbles to move downwardly into the body of molten glass, feeding marbles to the top of said column at a constant rate so that the column increases or decreases in height when the rate of said flow of streams from said body is less or greater respectively than said constant rate of feed of marbles to the top of said column, and varying the temperature of said body in direct order to the change in height of said column to thereby vary the viscosity of the molten glass in said body and the rate of flow of said streams from said body so as to keep the rate of flow substantially equal to said rate of feed of marbles to said column.

ALLEN L. SIMISON.

REFERENCES CITED

The following references are of record in the file of this patent:

UNITED STATES PATENTS

| Number | Name | Date |
|---|---|---|
| 2,229,489 | Barnard | Jan. 21, 1941 |
| 2,294,266 | Barnard | Aug. 25, 1942 |